United States Patent Office 3,232,914
Patented Feb. 1, 1966

3,232,914
POLYMETHYLENES HAVING NITROGEN-CONTAINING SIDE CHAINS
Charles John Pedersen, Salem, N.J., assignor to E. I. du Pont de Nemours and Company, Wilmington, Del., a corporation of Delaware
No Drawing. Filed Apr. 26, 1962, Ser. No. 190,218
16 Claims. (Cl. 260—87.5)

This invention relates to polymethylenes and, more particularly, it relates to modified polymethylenes having side chains substituted by groups containing nitrogen.

Chain-saturated hydrocarbon polymers are growing in commercial importance today for many applications, such as elastomers, thermoplastic molding compositions, fibers and the like. Many of these polymers, however, cannot be satisfactorily dyed, cured or modified and, therefore, their present and potential fields of use are seriously restricted.

It is an object of this invention to provide novel modified polymethylene polymers. Another object is to provide such polymers which have increased dye-receptivity. A further object is to provide such polymers which can be treated with a wide variety of chain-extending or curing agents. A still further object is to provide such polymers which, although modified to improve certain properties, show no loss of the desirable properties possessed by unmodified polymers. Other objects will appear hereinafter.

These and other objects are accomplished in accordance with this invention by a modified polymethylene wherein from about 5% to about 25% of the chain carbon atoms have attached thereto side chain radicals of the structure

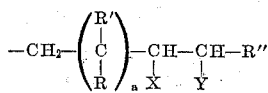

wherein $a$ is an integer from 0 to 5 inclusive; R, R' and R" are independently selected from the group consisting of hydrogen and lower alkyl radicals; X and Y are independently selected from the group consisting of primary amino, secondary amino, tertiary amino, quaternary ammonium, chlorine, bromine, iodine and hydrogen radicals; with the proviso that only one of X and Y can be other than primary amino, secondary amino, tertiary amino and quaternary ammonium; and with the further proviso that the inherent viscosity of a 0.1% by weight solution of said modified polymethylene in tetrachloroethylene at 25° C. be at least 0.05.

The inclusion of chlorine, bromine and iodine within the definition of X and Y is dictated primarily by the method of preparation of the modified polymethylenes which will be explained in detail hereinafter. These halogens, however, if present at all in the product must be accompanied by the nitrogen-containing radicals enumerated above; their presence does not detract from the desirable properties of the polymer.

If the inherent viscosity of the polymer is below about 0.05, the polymer is generally too fluid for most purposes.

The scope of the term "lower alkyl" is not particularly critical; however, the lower alkyl groups of methyl and ethyl are preferred.

The preferred method of preparing the modified polymethylenes of this invention involves the substitution of nitrogen-containing groups for a replaceable substituent already on a polymer. Preferred starting materials are the chain-saturated hydrocarbon polymers having side-chain bromine. Suitable starting polymers include copolymers of ethylene and

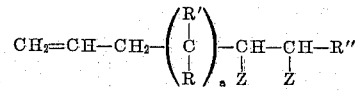

wherein R, R' and R" can be hydrogen or lower alkyl; $a$ is an integer preferably from 0 to 5 inclusive; and Z is chlorine, bromine, iodine or hydrogen; however, only one Z may be hydrogen. Preferably, at least one Z will be bromine and suitable monomers include 4-bromo-1-butene; 5-bromo-1-pentene; 7-bromo-1-heptene; 9-bromo-1-nonene; 11-bromo-1-hendecene; 13-bromo-1-tridecene; 15-bromo-1-pentadecene; 12-bromomethyl-1-tridecene; 5-bromo-1-hexene; 4,5-dibromo-1-hexene; and 5,6-dibromo-1-hexene. Representative examples of other halogenated olefins include: 4-chloro-1-butene; 5-chloro-1-pentene; 6-chloro-1-hexene; 11-chloro-1-hendecene; 11-iodo-1-hendecene; 4-chloro-1-pentene; 4-chloro-1-hexene; 5-chloro-1-hexene; 5-iodo-1-hexene; and 5,5,5-trichloro-1-pentene.

The starting copolymers may also contain monomer units of other unsaturated hydrocarbon monomers capable of being polymerized with a coordination catalyst. Examples of such monomers are: (a) alpha monoolefins of the structure R—CH=CH$_2$ where R is $C_1$–$C_{16}$ alkyl; (b) one or more non-conjugated hydrocarbon dienes. Representative examples of dienes include dicyclopentadiene; 5 - methylene-2 - norbornene; a 5 - alkenyl - 2 - norbornene; a 2-alkyl-2,5-norbornadiene, and an open-chain non-conjugated diene having the structure

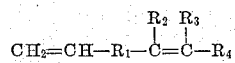

wherein $R_1$ is an alkylene radical; $R_2$ and $R_3$ are independently selected from the group consisting of hydrogen and alkyl radicals and $R_4$ is an alkyl radical and wherein $R_1$ to $R_4$ are so selected that the diene has from about 6–22 carbon atoms.

The above monomers may be polymerized in an inert solvent solution, e.g., methylene chloride, at temperatures from −10° C. to 25° C. in the presence of a coordination catalyst system, e.g., vanadium tris(acetylacetonate) with diisobutyl aluminum chloride with a molar ratio of aluminum to vanadium of about 9:1. The concentration of vanadium salt in the copolymerization reaction zone is about 0.00005 to 0.005 mole/liter.

Representative examples of the bromine-containing copolymers useful in making the modified polymethylenes of the present invention include: ethylene/5-bromo-1-pentene; ethylene/propylene/5 - bromo - 1 - pentene; ethylene/15 - bromo - 1 - pentadecene; ethylene/6-methyl-1 - heptene/5,6 - dibromo - 1 - hexene; ethylene/15-ethyl - 1,15 - heptadecadiene/4 - bromo - 1 - butene; ethylene/dicyclopentadiene/5,6 - dibromo - 1 - hexene; ethylene/4,4,5,5 -tetrabromo - 1 - hexene; ethylene/12-bromomethyl - 1 - tridecene; ethylene/5 - (1' - propenyl)-2-norbornene/9 - bromo - 1 - nonene; ethylene/2 - ethyl-norbornadiene/5 - bromo - 1 - pentene; ethylene/13-bromo - 1 - tridecene; ethylene/4,5 - dibromo - 1 - hexene; ethylene/5,6 - dibromo - 1 - hexene.

The copolymers containing side-chain bromine can also be made by adding bromine or hydrogen bromide to the side-chain carbon-carbon double bonds of ethylene/non-conjugated hydrocarbon diene copolymers which, in turn, can be made using the hydrocarbon dienes and the polymerization procedures heretofore described.

The halogenation and hydro-halogenation procedures familiar to those skilled in the olefin art can be used. Representative procedures which are applicable here are given in Synthetic Organic Chemistry, R. B. Wagner and H. D. Zook, John Wiley & Sons, Inc., New York, 1953, pages 106–108. It is not always necessary to isolate the hydrocarbon copolymer before adding the bromine. For example, after a copolymer has been made in solution and the catalyst deactivated with alcohol, one can add bromine at 0° C. in the amount desired and thereafter isolate the copolymer by conventional means.

As stated above the halogen-containing starting copolymers are modified to form the products of this invention by a substitution reaction which is generally carried out in an inert solvent. By the term "inert" is meant that the liquid medium does not interfere with the desired course of the reaction. Representative and preferred solvent combinations include: a mixture of 5 volumes of xylene and 1 volume of tetramethylene sulfone; 5 volumes of xylene and 1 volume of dimethyl sulfoxide. Other liquid media which may also be present include benzene, toluene, and peroxide-free cumene. Still other solvents include: benzonitrile; nitrobenzene; dimethylformamide; and N-methyl pyrrolidone.

The solvent can accelerate the reaction without necessarily adversely affecting the course of the reaction. Thus, the medium can be called "inert" even though it may influence the speed of the substitution reaction. For the desired substitution reaction an increase in the solvent ionizing power, that is, an increase in the polarity of the solvent, will have little effect if the bromine is being displaced by a negatively charged species; however, there will be a large acceleration in the rate of the substitution reaction if the bromine is being displaced by a neutral molecule such as a primary amine. It should be remembered that when ionization of the bromine from the polymer precedes the addition of the substituting group, an increase in the ionizing power of the solvent will greatly accelerate the reaction.

The reaction temperature range which has been found convenient when the above recommended solvents were employed extends from about 130 to 145° C. Higher or lower temperatures can be employed; however, lower temperatures may require inconveniently long reaction times. Higher temperatures may increase the importance of the competing nucleophilic elimination reaction, wherein ethylenic unsaturation occurs upon loss of the halogen. The time required to complete the substitution will vary depending upon the structure of the group holding the bromine atom which is to be replaced. In general, the reaction is largely completed within about 1 to 2 hours at temperatures within the above-described range.

When acid is liberated during the substitution reaction, it is useful to add base. If the substituting group is an amine, a quantity of amine larger than the number of moles of bromine being displaced can be employed. Potassium carbonate also can be used. When an alkali metal salt such as the potassium or sodium salt of the substituting group is employed, it is merely necessary to filter off the precipitated alkali metal bromide at the end of the reaction. Residual inorganic salts can be removed by extracting the polymer solution with water. The modified polymethylene products of the present invention are finally obtained by removing the solvent and drying the solid thereby obtained. This removal can be carried out by such familiar means as evaporative distillation or drum drying, or precipitation with a nonsolvent. The modified polymethylene can be dried in a conventional vacuum oven or air dried or, when sufficiently plastic, can be mill dried on a rubber roll mill or a similar device.

The preferred embodiments of the invention will now be illustrated in and by the following examples:

*Example I*

The ethylene/5-bromo-1-pentene/1,4-hexadiene copolymer is selected having 43.6% by weight ethylene monomer units, 51.2% by weight 5-bromo-1-pentene monomer units, and 5.2% by weight 1,4-hexadiene monomer units and exhibits an inherent viscosity (0.1% by weight solution in toluene at 30° C.) of 0.79.

The following are introduced into a flask under a nitrogen atmosphere: 5.68 grams (1.56 grams or 0.0195 gram-atom of bromine) of the above-described copolymer in 160 ml. of xylene, 50 ml. of peroxide-free cumene, 0.5 gram of antioxidant "Calco 425,"* 20 ml. of tetramethylene sulfone, and 17.3 grams (0.175 mole) of cyclohexylamine. The resulting composition is agitated at reflux at 143° C. at atmospheric pressure for 2 hours. The reaction mixture is cooled to 60° C. and concentrated while agitated under vacuum. 400 ml. of water containing 4 grams of sodium hydroxide are added. The light-gray soft polymer obtained is washed with water and, while wet, is dissolved in 400 ml. of boiling benzene at atmospheric pressure. The clear filtrate obtained from this solution is concentrated at 60° C. while agitated under vacuum until the weight of the charge drops to 130 grams. A gel results which disappears on warming. The system becomes homogeneous on the addition of about 500 ml. of methanol; in all, 870 ml. of anhydrous methanol are added. After the solution has been allowed to stand at room temperature, it is concentrated nearly to dryness while agitated under vacuum. Then 980 ml. of water are introduced and the resulting mixture is warmed over a steam bath. The liquid phase is decanted and the residual solid is washed with water and dried in a vacuum oven at 40° C. The gray elastomer obtained weighs 5.9 grams. This copolymer contains 0.4–0.5% bromine by weight, 4.0–4.1% nitrogen and exhibits an inherent viscosity (0.1% solution by weight in toluene at 30° C) of 1.41–1.42. The analyses correspond to the following side-chain distribution per 100 chain-carbon atoms:

7.7
0.9 —CH$_2$—CH=CH$_2$
0.2 —CH$_2$—CH$_2$—CH$_2$—Br
1.6 —CH$_2$—CH=CH—CH$_3$

The

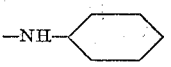

group concentration is 2.92 gram-moles/kilogram. The elastomer can be pressed into a film and can be dyed with indigo sodium disulfonate.

*Example II*

Into an agitated 500 ml. reactor are introduced: 3.27 grams of the bromine-containing copolymer of Example I (dissolved in 100 ml. of benzene) and 100 ml. of toluene, 0.5 gram of antioxidant Calco 425, 20 ml. of xylene, 20 ml. of tetramethylene sulfone, and 50 ml. of peroxide-free cumene. To this mixture there are added 20 ml. of monoethanolamine (0.328 gram-mole); benzene and toluene are then distilled off until the temperature has risen to 132° C. The composition is refluxed at this temperature at atmospheric pressure for 2 hours. The liquid phase is then concentrated to 31.8 grams while agitated under vacuum. The residue is thoroughly washed with methanol containing 5% by weight potassium hydroxide. After a final wash with methanol the solid obtained is dried in the vacuum oven at 40° C. to give 2.5 grams of cross-linked, white, tough copolymer containing 0.1% bromine and 4.4–4.56% nitrogen. These analyses correspond to the following side-chain distribution per 100 chain-carbon atoms:

8.8 —CH$_2$—CH$_2$—CH$_2$—NH—CH$_2$—CH$_2$—OH
1.6 —CH$_2$—CH=CH—CH$_3$

The —NH—CH$_2$—CH$_2$—OH group content in the copolymer is 19.0% by weight or 3.17 gram-moles/kilogram.

*[2,2'-methylene-bis-(4-ethyl-6-tert-butylphenol).]

The copolymer can be dyed with indigo sodium disulfonate.

Example III

Into the above-described equipment there are introduced: 2.72 grams (0.068 gram-mole) of sodium hydroxide and 45 ml. of water, 5.1 grams of glycine (0.068 gram-mole), 100 ml. of benzene, 85 ml. of xylene, and 55 ml. of dimethylsulfoxide, and 174.5 grams of xylene solution containing 9.91 grams of the copolymer of Example I. Heat is applied and 49 ml. of water and 193 ml. of solvent are distilled off. For 5 minutes the remaining charge is heated at reflux at atmospheric pressure at 131.5° C. A smooth gel is then formed. One portion is made acid with acetic acid. This fraction weighs 26 grams while moist, 8.2 grams after drying (in a vacuum oven at 40° C.). It contains 0.6% by weight nitrogen and 23.6% by weight bromine corresponding to the following side-chain distribution per 100 chain-carbon atoms:

$$
\begin{array}{ll}
1.3 & -CH_2-CH_2-CH_2-NH-CH_2-\overset{O}{\overset{\|}{C}}-OH \\
0.1 & -CH_2-CH=CH_2 \\
7.5 & -CH_2-CH_2-CH_2-Br \\
1.6 & -CH_2-CH=CH-CH_3
\end{array}
$$

The $$-NHCH_2-\overset{O}{\overset{\|}{C}}-OH$$

group concentration in the copolymer is 3.4% by weight or 0.46 gram-mole/kilogram.

The product is a light-brown resilient elastomer.

Example IV

Into a one-liter reactor are introduced 2.85 grams of the copolymer of Example I, 15 ml. of peroxide-free cumene, 10 ml. of xylene, 10 ml. of tetramethylene sulfone, 0.5 gram of antioxidant Calco 425, and 5 grams (0.575 gram-mole) of anhydrous morpholine. This composition is refluxed and stirred under nitrogen at atmospheric pressure at 153° C. for 1 hour. The mixture obtained is concentrated while agitated under vacuum and combined with 300 ml. of water containing 2 grams of sodium hydoxide. This composition is warmed on a steam bath and the solid which separates is filtered off, washed with water, and dissolved in warm (80° C.) benzene. The resulting solution is filtered through coarse paper and the filtrate is concentrated while agitated under vacuum to give 3.1 grams of a near-white solid. After this material has been soaked in 300 ml. of methanol, it is thoroughly washed with methanol, and dried in a vacuum oven at 40° C. There are obtained 2.5 grams of a light-pink tacky elastomer containing 0.2–0.4% bromine and 4.5% nitrogen, and exhibiting an inherent viscosity (0.1% by weight solution in toluene at 30° C.) of 0.84. This copolymer dissolves readily in benzene and is precipitated by hydrogen chloride gas. The solid is soluble in methanol and precipitated by potassium sulfide. The analysis indicates that the side-chain distribution per 100 chain-carbon atoms is as follows:

8.7 

1.6 —CH$_2$—CH=CH—CH$_3$

The

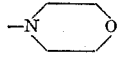

group concentration in the copolymer is 27.6% by weight or 3.21 gram-moles/kilogram.

This copolymer can be pressed into a film.

Example V

The following composition is stirred at reflux under a nitrogen atmosphere at about 40° C. at atmospheric pressure for 40 minutes: 1 gram of the modified copolymer made in Example IV above dissolved in 70 ml. of benzene and 10 ml. of ethyl bromide. Then 5 ml. of tetramethylenesulfone, and 10 ml. of ethyl bromide are introduced while reflux is continued. After 12 hours and 20 minutes the heat is turned off and the mixture is allowed to stand for 2 days at room temperature. The mixture is then re-heated at reflux for 12 more hours and the liquid phase is concentrated while agitated under vacuum. The residue (7.3 grams) is thoroughly washed with acetone and dried in a vacuum oven at 40° C. There is obtained 0.6 gram of a light-pinkish elastomer containing 4% nitrogen and 5.2% bromine by weight. These analyses correspond to the following side-chain distribution per 100 chain-carbon atoms:

1.8 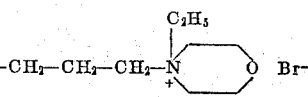

6.9 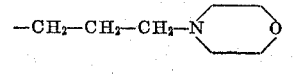

1.6 —CH$_2$—CH=CH—CH$_3$

The

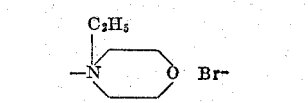

group concentration in the copolymer is 11.5% by weight or 0.59 gram-mole/kilogram.

The

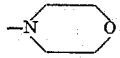

group concentration in the copolymer is 20.6% by weight or 2.40 gram-moles/kilogram.

The copolymer can be formed into a film; it is insoluble in hot toluene but soluble in benzonitrile and in nitrobenzene.

Example VI

Twenty-five ml. of dimethylsulfoxide, 22 grams of anhydrous ammonia (1.3 gram-moles), and 7.56 grams of the copolymer of Example I (containing 0.026 gram-atom of bromine) in 145 ml. of mixed xylenes are charged into a 300 ml. shaker tube at 12° C. and thereafter heated at autogeneous pressure at 140° C. for 6 hours. After the tube has been cooled to room temperature the contents are removed and poured into 600 ml. of methanol. The copolymer thereby coagulated is dried to give 4.3 grams of grayish elastomer containing 4% nitrogen and 1.4% bromine corresponding to the following side-chain distribution per 100 chain-carbon atoms:

2.8 —CH$_2$—CH$_2$—CH$_2$—NH$_2$
5.6 (CH$_2$—CH$_2$—CH$_2$)$_2$NH
1.6 —CH$_2$—CH=CH—CH$_3$
0.4 —CH$_2$—CH$_2$—CH$_2$—Br

The NH$_2$ group and the NH group concentrations in the copolymer are 2.29 and 2.14% by weight, respectively, or 1.43 gram-moles/kilogram of each.

White portions of the elastomer product contain 4% bromine and 5.6% nitrogen corresponding to the following side-chain distribution per 100 chain-carbon atoms:

7.8 —CH$_2$—CH$_2$—CH$_2$—NH$_2$
1.6 —CH$_2$—CH=CH—CH$_3$
1.0 —CH$_2$—CH$_2$—CH$_2$—Br

The NH$_2$ group concentration in the white elastomer is 6.09% by weight or 3.81 gram-moles/kilogram. The grayish elastomer is dyeable with indigo disulfonic acid.

Example VII

A composition consisting of: 12.64 grams of an ethylene/5,6-dibromo-1-hexene copolymer (containing 0.0251 gram-atom of bromine), 200 ml. of mixed xylenes, 37 ml. of dimethyl sulfoxide, and 10.5 grams (0.1 gram-mole) of diethanolamine is stirred under a nitrogen atmosphere at 140° C. for 68 minutes. The solution obtained is concentrated while agitated under vacuum to give 34 grams of a mixture of liquid and solid. This is poured into one liter of water and the white elastomer which separates is collected and dissolved in 400 ml. of benzene at 80° C.; one gram of Celite is added and the mixture is filtered through coarse and fine paper. A filtrate is concentrated while agitated to give 4 grams of a white sticky polymer containing 29.4–29.5% bromine and 1.26–1.29% nitrogen. This corresponds to the following side-chain distribution per 100 chain-carbon atoms:

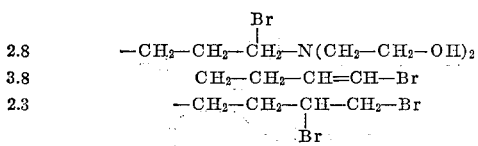

2.8  —CH$_2$—CH$_2$—CH$_2$—N(CH$_2$—CH$_2$—OH)$_2$
3.8  CH$_2$—CH$_2$—CH=CH—Br
2.3  —CH$_2$—CH$_2$—CH—CH$_2$—Br
                       |
                       Br

The —N(CH$_2$—CH$_2$—OH)$_2$ group concentration in the copolymer is 0.93 gram-mole/kilogram.

The polymer easily forms films and can be dyed with indigo sodium disulfonate but it will not dye with methylene blue. The copolymer forms a coordination complex with divalent copper ion.

Example VIII

An ethylene/5,6-dibromo-1-hexene copolymer is selected which contains 49.6% bromine by weight and contains 25.0% by weight ethylene monomer units and 75.0% by weight 5,6-dibromo-1-hexene monomer units.

To a solution of 7.1 grams of the copolymer in 300 ml. of xylene are added 15.3 grams of anhydrous morpholine (0.176 gram-mole), 60 ml. of dimethyl sulfoxide, and 0.2 gram of antioxidant Calco 425. The resulting composition is refluxed at atmospheric pressure under a nitrogen atmosphere at 140° C. for 2 hours. The clear light yellow solution obtained is cooled to 100° C. and 250 ml. of water are introduced. After the composition has been agitated for 15 minutes, it is transferred to a separatory funnel. The water layer is drawn off; the milky organic layer is washed with 250 ml. of water and dried under a vacuum while agitated. The 7.8 grams of pinkish elastomer obtained are dissolved in 200 ml. of benzene, and the resulting solution is filtered through coarse and fine paper. After the filtrate has been concentrated while agitated under vacuum to a weight of 10.1 grams, it is then introduced into 300 ml. of methanol under nitrogen at room temperature. It is washed again with fresh methanol and dried under high vacuum at 40° C. for 5 hours. The resulting product is a salmon-colored elastomer weighing 6.6 grams and containing nitrogen and 19.3% bromine. This corresponds to the following side-chain distribution per 100 chain-carbon atoms:

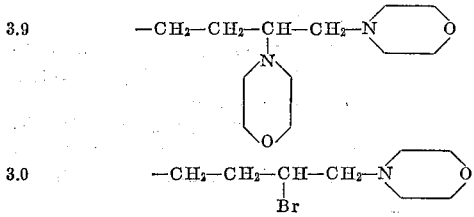

6.0 —CH$_2$—CH$_2$—CH=CH—Br

The inherent viscosity (0.1% by weight solution in toluene at 30° C.) is 0.47. The elastomer can be pressed into a film and can be dyed blue with indigo sodium disulfonate.

Example IX

To a 1000 ml. reactor are added 140 ml. of xylene containing 5 grams of the copolymer of Example I, 30 ml. of tetramethylene sulfone, 5.7 grams (0.0346 gram-mole) of N-(n-butyl)-p-aminophenol, and 6.9 grams (0.05 gram-mole) of pulverized potassium carbonate. After this composition has been agitated at reflux under a nitrogen atmosphere at 144° C. for 15 minutes, the composition gels. The solvent is removed at reduced pressure to give 4.8 grams of a light gray soft elastomer containing 13.1–13.4% bromine and 1.67–1.76% nitrogen.

This analysis corresponds to the following side-chain distribution per 100 chain-carbon atoms:

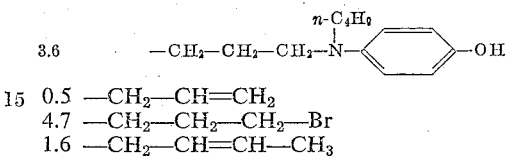

0.5  —CH$_2$—CH=CH$_2$
4.7  —CH$_2$—CH$_2$—CH$_2$—Br
1.6  —CH$_2$—CH=CH—CH$_3$

The

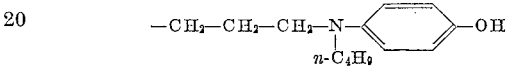

group concentration in the copolymer is 1.26 gram-moles/kilogram. This elastomer can be dyed with indigo sodium disulfonate.

Example X

The following composition is agitated at reflux under a nitrogen atmosphere at atmospheric pressure at 144–146.5° C.: 140 ml. of xylene containing 5 grams of the copolymer of Example I (containing 0.0172 gram-atom of bromine), 30 ml. of tetramethylene sulfone and 3.25 grams (0.0344 gram-mole) of 2-aminopyridine. After 2 hours the reaction mass will have cooled slightly and 50 ml. of toluene are introduced to reduce the viscosity of the partially gelatinous mass. The composition is then concentrated while agitated under vacuum, the residue is poured into 400 ml. of methanol at room temperature and allowed to stand for about 16 hours at room temperature. After the copolymer thereby coagulated has been washed with 200 ml. of methanol and 100 ml. of acetone, it is dried in a vacuum oven at 40° C. for 16 hours. This process yields 4.5 grams of a yellow tough product containing 6.0–6.2% nitrogen and 6.8–7.0% bromine. This corresponds to the following side-chain distribution per 100 chain-carbon atoms:

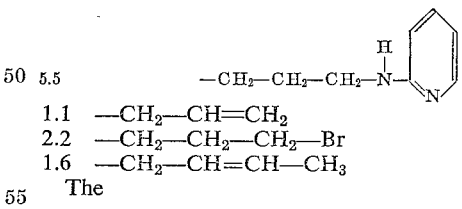

1.1  —CH$_2$—CH=CH$_2$
2.2  —CH$_2$—CH$_2$—CH$_2$—Br
1.6  —CH$_2$—CH=CH—CH$_3$

The

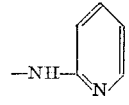

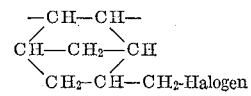

group content in the copolymer is 2.18 gram-moles/kilogram.

The yellowish tough elastomer can be dyed with indigo sodium disulfonate and is able to coordinate both ferric and cupric ions.

If, in the above examples sodium cyanide is used on the bromine-containing copolymers, a substitution of the —CN group takes place for the Br and an oil-resistant, modified polymethylene is obtained.

If the starting copolymer contains units of the formula:

$$\begin{array}{c}-CH-CH-\\ \diagup \qquad \diagdown \\ CH-CH_2-CH\\ \diagdown \qquad \diagup \\ CH_2-CH-CH_2-\text{Halogen}\end{array}$$

or

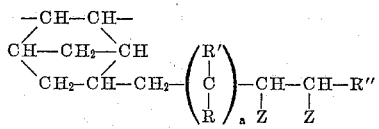

wherein R, R' and R" are hydrogen or lower alkyl; $a$ is an integer preferably from 0 to 5 inclusive; and Z is halogen or hydrogen; however, only one Z may be hydrogen;

the substitution reaction takes place at one or both halogens and modified polymethylenes are obtained having properties similar to those described above.

The modified polymethylene products of the present invention range in character from stiff "plastics" to soft elastomers. The products which have a moderate proportion of side-chain groups can be elastomeric in nature. The side-chain substituents present in the novel modified polymethylenes gives them a flexibility in curing procedures not possessed by the conventional α-olefin copolymers (e.g., ethylene/propylene copolymer or ethylene/propylene/1,4-hexadiene copolymers) or by the modified polymethylenes containing side-chain halogen (e.g., ethylene/5,6-dibromo-1-hexene/1,4-hexadiene copolymers). Furthermore, better adhesion, solvent resistance, dyeability, and valuable ion exchange properties are conferred by appropriate substitutents.

Those modified polymethylenes having sites which promote dyeability such as amino groups can be colored to give useful and aesthetically pleasing products. The modified polymethylene bearing side-chain amino and hydroxyl groups can be further altered by reacting them with mono and polycarboxylic acids; the hydroxyl, amino, and carboxyl-substituted modified polymethylenes of the present invention are broadly useful in curing polyisocyanate and polyisothiocyanate compositions. They can be reacted with monomeric organic diisocyanates, such as are described by Siefken (Ann. 562, 110–135 (1949)) or in U.S. Patents 2,728,727, 2,847,440, 2,865,940, 2,891,983, 2,963,504, 2,967,193, 2,978,476 and 2,986,576. They can also be reacted with NCO-terminated polyurethanes such as polyisocyanate-terminated polyesters (U.S. Patents 2,620,516, 2,621,166, 2,729,618; French Patent 1,201,467; Australian application 20,059/53); NCO-terminated polyalkyleneether polyurethanes (U.S. Patents, 2,726,219, 2,850,461, 2,901,445, 2,901,467, 2,917,489, 2,929,800; British Patents 733,624, 794,044, 797,965); NCO-terminated polyalkyleneether-thioether glycols (U.S. Patent 2,917,489); NCO-terminated castor oil-epoxy resin condensation products (U.S. Patent 2,788,335).

They can be used to cure liquid NCO-terminated polyalkyleneether (or polyester) polymers for encapsulating electronic equipment and making molded solid articles, fibers for cloth, films for packaging applications, calks for sealing windows and masonry and boats, and protective coatings for floors and decks and the like. Cellular products useful for fabricating crash pads, topper pads, resilient cushions, rigid insulation panels, and the like, result when gas or a gas-forming agent is incorporated for expanding the liquid mixture prior to cure. Solutions of the polyisocyanate compositions in volatile inert liquid media can be applied to substrates such as wood, glass, or steel by conventional methods such as roll coating, swabbing, or spraying. Furthermore, they can be made NCO-terminated when they are reacted with a molar excess of an organic polyisocyanate. The NCO-terminated modified polymethylenes resulting can be substituted for part or all of the above-described polyisocyanates for any of the applications heretofore described. Thus, they can be used as adhesives for joining metal, wood, and glass members, and for joining metal to neoprene; they can be employed to coat non-woven fabrics; they can be used to make cellular cushions, topper pads, and the like.

The HO modified polymethylenes can also be reacted with molar proportions of dicarboxylic acids or anhydrides or carboxyl-terminated polymers to make polyesters. They can be reacted with polyesters to make new polyesters by transesterification. The polyester products can be used to fabricate films for packaging applications, molded parts for machinery, fibers for clothing, etc.

The

modified polymethylenes can be used to make polyesters by transesterification with polyesters or with HO-modified polymethylenes or with polyols such as the monomeric polyols (e.g., ethylene glycol, trimethylolpropane) described in French Patent 1,246,584 and hydroxyl-terminated polymers such as hydroxyl-terminated polyhydrocarbons (U.S. Patent 2,877,212), fatty acid triglycerides (2,833,730 and 2,787,601); hydroxyl-terminated polyformals (U.S. Patent 2,870,097); hydroxyl-terminated polyesters (U.S. Patents 2,698,838, 2,921,915, 2,591,884, 2,866,762, 2,850,476, 2,602,783, 2,729,618, 2,779,689, 2,811,493 and 2,621,166); hydroxyl methyl-terminated perfluoromethylenes (U.S. Patents 2,911,390 and 2,902,473); polyalkyleneether triols (U.S. Patent 2,866,774; Belgian Patent 582,076); polyalkyleneether glycols (U.S. Patent 2,808,391; British Patent 733,624). The

modified polymethylene polymers can be reduced to the corresponding HO-polymers with lithium aluminum hydride.

The modified polymethylenes containing side-chain CN groups exhibit increased solvent resistance, the higher the CN content the greater the resistance to swelling. The CN groups can be catalytically hydrogenated with a metal catalyst in the presence of ammonium to obtain the corresponding —CH$_2$—NH$_2$ group.

Significant modification in the polymer properties can occur even when only a small proportion of side-chain groups bearing oxygen or nitrogen atoms is present. For example, when there is, on the average, less than 0.1 amino group per 100 chain-carbon atoms, the modified polymethylene will exhibit increased retention of dyes and other compounds which can form salts therewith. When a very small proportion of substituents bearing Zerewitinoff active hydrogen atoms, for example, hydroxyl, carboxyl, or amino groups are present, the modified polymethylene can be reacted with monomeric polyisocyanates and NCO-terminated polyurethanes for chain-extension, cross-linking, and the formation of block copolymers.

The modified polymethylenes of the present invention can be cured by a wide variety of procedures whose selection depends upon the nature of the substituents in the side-chain. Polymers containing carbon-carbon double bonds as cure sites can be cured by the sulfur recipes familiar to those skilled in the art. These polymers containing no double bonds can be cured by free radical reagents such as dicumyl peroxide with or without radical traps. Polymers containing hydroxyl groups can be cured by esterification with dibasic acid (carboxylic, sulfonic, phosphonic, and the like), and by reaction with polyisocyanates. Polymers containing amino functions can be cured as follows: primary and secondary amine—salts and amides of dibasic acids; coupling with organic dihalides; coordination with polyvalent methyl ions; reaction with diisocyanates. Primary amino groups can also be reacted with dialdehydes and diketones. Tertiary amines—salt formation with dibasic acids; coordination with metal ions; and formation of diquaternary compounds with organic dihalides.

What is claimed is:

1. A curable modified polymethylene wherein from about 5% to about 25% of the chain-carbon atoms have one of their hydrogen atoms replaced by side-chain radicals of the structure

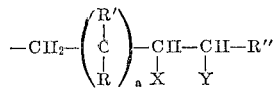

wherein: $a$ is an integer from 0 to 5 inclusive; R, R' and R'' are independently selected from the group consisting of hydrogen, methyl and ethyl; X and Y are independently selected from the group consisting of —NH$_2$, —NHZ$_1$, —NZ$_1$Z$_2$, quaternary ammonium radicals of the foregoing, cyano, chlorine, bromine, iodine and hydrogen radicals; with the proviso that only one of X and Y can be other than —NH$_2$, —NHZ$_1$, —NZ$_1$Z$_2$ and their quaternary ammonium radicals and that Z$_1$ and Z$_2$ are selected from (a) unsubstituted hydrocarbon radicals of no more than 6 carbon atoms, (b) such radicals substituted by —OH and —COOH groups and (c) dialkylene oxide radicals formed by Z$_1$ and Z$_2$ together; and with the further proviso that the inherent viscosity of a 0.1% by weight solution of said modified polymethylene in tetrachloroethylene at 25° C. be at least 0.05.

2. A modified polymethylene according to claim 14 wherein said side-chain radicals have the structure

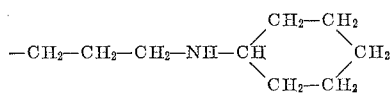

3. A modified polymethylene according to claim 14 wherein said side-chain radicals have the structure

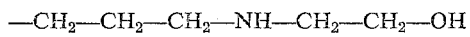

4. A modified polymethylene according to claim 14 wherein said side-chain radicals have the structure

5. A modified polymethylene according to claim 14 wherein said side chain radicals have the structure

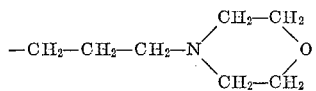

6. A modified polymethylene according to claim 14 wherein said side chain radicals have the structure

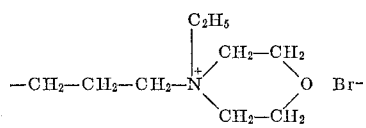

7. A modified polymethylene according to claim 14 wherein said side-chain radicals have the structure

—CH$_2$—CH$_2$—CH$_2$—NH$_2$

8. A modified polymethylene according to claim 14 wherein said side-chain radicals have the structure

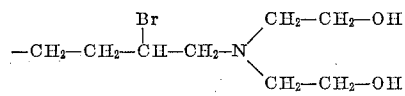

9. A modified polymethylene according to claim 14 wherein said side-chain radicals have the structure

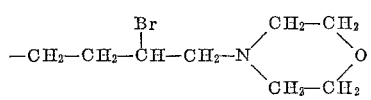

10. A modified polymethylene according to claim 14 wherein said side-chain radicals have the structure

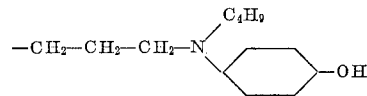

11. A modified polymethylene according to claim 14 wherein said side-chain radicals have the structure

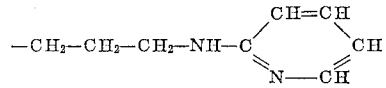

12. A modified polymethylene according to claim 14 wherein said side-chain radicals have the structure

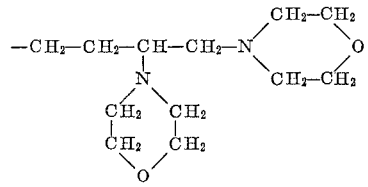

13. A modified polymethylene according to claim 1 wherein said side-chain radicals have the structure

—CH$_2$—CH$_2$—CH$_2$—NH—CH$_2$—CH$_2$—CH$_2$— each of said terminal groups being attached to a polymethylene chain.

14. A curable copolymer of ethylene containing monomer units of ethylene, a non-conjugated hydrocarbon diene and a monomer of the formula CH$_2$=CH—A wherein the radical A is selected from the group consisting of (a) 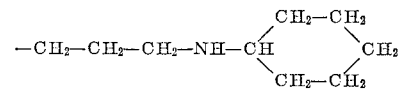

(b) —CH$_2$—CH$_2$—CH$_2$—NH—CH$_2$—CH$_2$—OH (c) 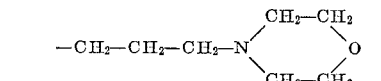

(d) 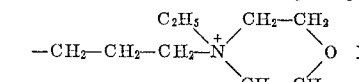

(e) 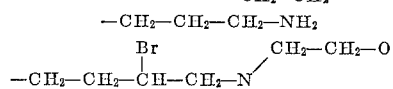

(f) —CH$_2$—CH$_2$—CH$_2$—NH$_2$ (g) 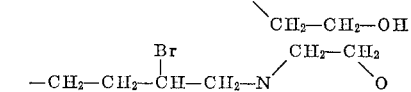

(h) 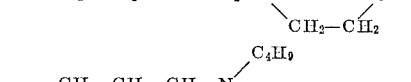

(i) 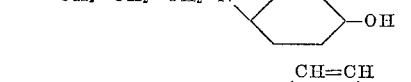

(j) 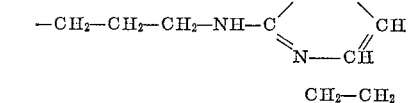

(k) 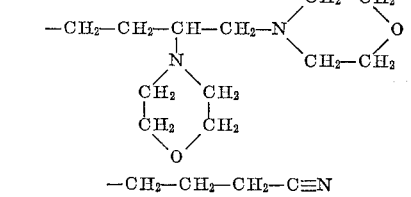

(l) —CH$_2$—CH$_2$—CH$_2$—C≡N with the proviso that said monomer units $CH_2=CH-A$ are present in such amount that from about 5 to 25% of the chain carbon atoms of said copolymer are substituted by said side-chain radicals, and said non-conjugated diene units are present in such amounts that up to about 6% of the chain carbon atoms of said copolymer are substituted by unsaturated side-chain radicals; and the further proviso that the inherent viscosity of a 0.1 weight percent solution of said copolymer in tetrachloroethylene at 25° C. is at least 0.05.

15. A copolymer according to claim 14 wherein said side-chain radicals have the structure $$-CH_2-CH_2-CH_2-C\equiv N$$

16. The modified polymethylene of claim 1 in the cured state.

References Cited by the Examiner
UNITED STATES PATENTS

| | | | |
|---|---|---|---|
| 2,728,758 | 12/1955 | Field et al. | 260—94.9 |
| 2,825,721 | 3/1958 | Hogan et al. | 260—94.9 |
| 2,933,480 | 4/1960 | Gresham et al. | 260—80.7 |
| 3,012,022 | 12/1961 | Reed et al. | 260—94.9 |
| 3,025,257 | 3/1962 | Coler et al. | 260—94.9 |
| 3,029,231 | 4/1962 | Van Amerogen | 260—87.5 |
| 3,093,621 | 6/1963 | Gladding | 260—80.5 |

JOSEPH L. SCHOFER, *Primary Examiner.*
WILLIAM H. SHORT, *Examiner.*